(12) United States Patent
Knoll et al.

(10) Patent No.: US 6,340,232 B1
(45) Date of Patent: Jan. 22, 2002

(54) LIGHTING UNIT

(75) Inventors: Peter Knoll, Ettlingen; Gunther Haas; Arndt Wagner, both of Leonberg, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/341,345

(22) PCT Filed: Sep. 8, 1997

(86) PCT No.: PCT/DD97/01983

§ 371 Date: Jul. 8, 1999

§ 102(e) Date: Jul. 8, 1999

(87) PCT Pub. No.: WO98/30835

PCT Pub. Date: Jul. 16, 1998

(30) Foreign Application Priority Data

Jan. 9, 1997 (DE) .......................................... 197 00 472

(51) Int. Cl.[7] .............................................. G01D 11/28
(52) U.S. Cl. .............................. 362/26; 362/27; 362/31
(58) Field of Search ............................. 362/26, 27, 31, 362/255

(56) References Cited

U.S. PATENT DOCUMENTS

| | | | | |
|---|---|---|---|---|
| 4,714,983 A | | 12/1987 | Lang ........................... 362/27 |
| 4,899,260 A | * | 2/1990 | Schrammek et al. ......... 362/300 |
| 5,400,224 A | | 3/1995 | Dunah et al. .................. 362/31 |
| 5,526,237 A | * | 6/1996 | Davenport et al. ........... 362/255 |
| 5,550,715 A | * | 8/1996 | Hawkins ....................... 362/27 |
| 5,654,779 A | * | 8/1997 | Nakayama et al. ............ 362/26 |
| 5,695,269 A | * | 12/1997 | Lippmann et al. ............. 362/27 |
| 5,703,612 A | * | 12/1997 | Salmon et al. ................. 362/23 |
| 5,934,782 A | * | 8/1999 | Atkins et al. .................. 362/26 |
| 5,990,989 A | * | 11/1999 | Ozawa ......................... 362/31 |
| 6,108,060 A | * | 8/2000 | Funamoto et al. ............. 362/27 |

FOREIGN PATENT DOCUMENTS

| | | |
|---|---|---|
| DE | 196 52 209 | 6/1998 |
| EP | 0 751 340 | 1/1997 |
| GB | 2 259 176 | 3/1993 |
| JP | 6-67177 | 3/1994 |
| JP | 8-95041 | 4/1996 |
| JP | 6-265882 | 9/1996 |

* cited by examiner

Primary Examiner—Sandra O'Shea
Assistant Examiner—Peggy Neils
(74) Attorney, Agent, or Firm—Kenyon & Kenyon

(57) ABSTRACT

An illumination unit for planar illumination is described. The illumination unit includes a light source and a waveguide plate, the waveguide plate being provided with mounting possibilities for the light source, various optical filters, electronics boards, and a liquid-crystal cell.

22 Claims, 2 Drawing Sheets

LIGHTING UNIT

FIELD OF THE INVENTION

The present invention relates to an illumination unit.

BACKGROUND INFORMATION

An illumination unit for planar illumination is already known from the related art. Such an illumination unit is used, for example, in the liquid-crystal display (LCD) of the firm Toshiba with the type designation TFD 50 W 30. The LCD has a supporting frame in which the different components, such as the liquid-crystal cell, light guide of the illumination unit, lamp for the illumination unit, reflectors for the illumination unit, as well as the control electronics are mounted. Because the design is composed of many components, considerable expenditure of energy is necessary to assemble the LCD.

SUMMARY

The arrangement according to the present invention has the advantage that the assembly of the LCD requires considerably less time, and is therefore more cost-effective.

A further advantage is that the components of the LCD can be manufactured at a lower cost per unit.

Finally, a further benefit is that the illumination unit of the present invention allows a modular design of the liquid-crystal display which appears easy to automate.

DETAILED DESCRIPTION

Figure 1:
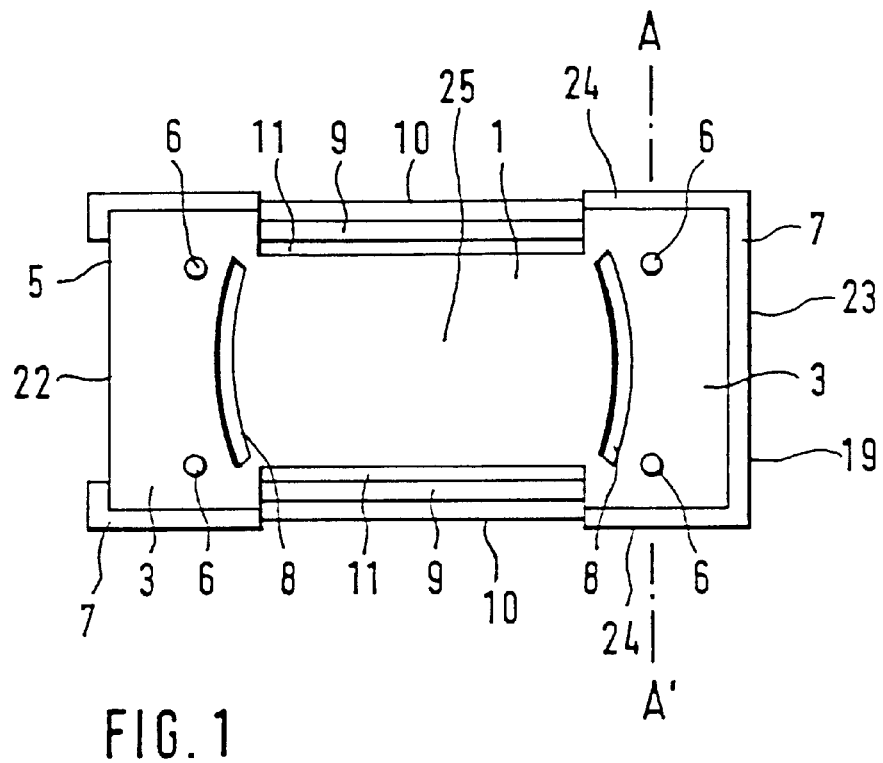
FIG. 1: shows a front view of an illumination unit in accordance with an example embodiment of the present invention.

FIG. 1 shows the front view of an illumination unit according to the present invention. The illumination unit has a base plate 19 which is made of transparent or slightly diffusive material. The basic form of base plate 19 is that of a flat, rectangular cuboid having two short end faces 22 and 23, two long end faces 24 and two top surfaces 25 and 26, the first top surface 25 having a slightly raised, surrounding rim which is designed as a retaining frame 7. The two long end faces 24 have a depression 11 which has a rectangular cross-section and extends from first top surface 25 to second top surface 26. The first, short end face 22 is provided with a cutout 5 whose width and depth are so dimensioned that a cable, ribbon cable or conductor strip can be run through cutout 5 from first top surface 25 to second top surface 26. Arranged on first top surface 26, in each of the corners between a long end face and a short end face, is a fixing pin 6 formed as a cylindrical body which is approximately perpendicular to the first top surface. Running along short end faces 22 and 23 are two slits 8 which are approximately perpendicular to the top surfaces and interconnect them. The length of the slits is selected such that they are as long as possible, but do not connect the long end faces, and do not jeopardize the structural stability of base plate 19. A lamp is mounted in each of the two depressions 11, the lamp having an elongated, cylindrical shape and its longitudinal axis running in a direction parallel to the longitudinal axis of base plate 19. Also located in depression 11, on the side of lamp 9 facing away from base plate 19, is a reflector 10. A line AA' defining the sectional plane for the sectional drawing depicted in FIG. 3 is drawn in between two of depression pins 6.

Figure 2:
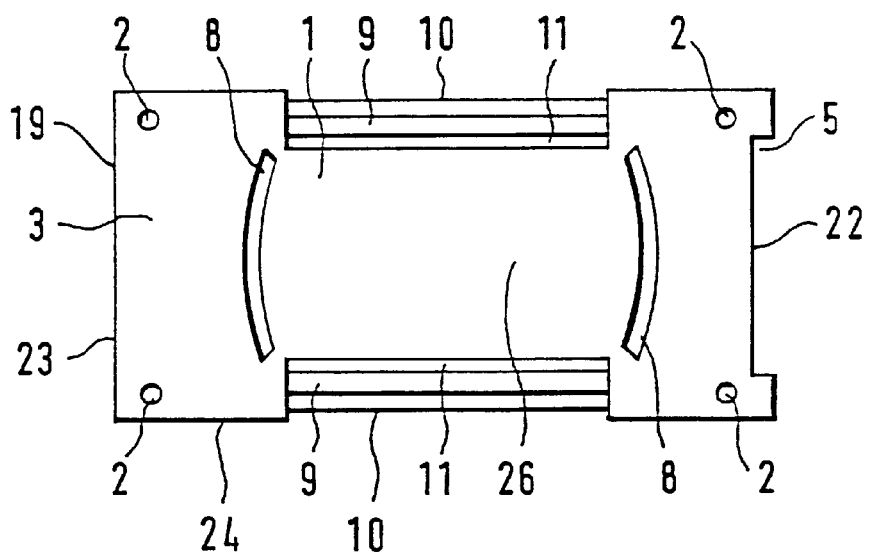
FIG. 2: shows a rear view of an illumination unit accordance to the present invention.

FIG. 2 shows a rear view of the illumination unit depicted in FIG. 1, identical component parts being provided with identical reference numbers. Again, a base plate 19 having a basic rectangular form is shown, the second top surface 26 being visible in the rear view. Cutout 5 can be seen in the first short end face; the two end faces 24 have one depression 11 each. One lamp 9 and one reflector 10 each are mounted in depression 11. The two slits 8, which were already visible in FIG. 1, run between the mutually opposing corners of depression 11. Slits 8 divide base plate 19 into a mounting zone 3 and a waveguide zone 1. In this context, the area of base plate 19 located between the two slits 8 is designated as waveguide zone 1, while the expression mounting zone 3 refers to the remaining areas of base plate 19. The drawing shows four mounting bore holes 2 in the corners of second top surface 26.

Figure 3:
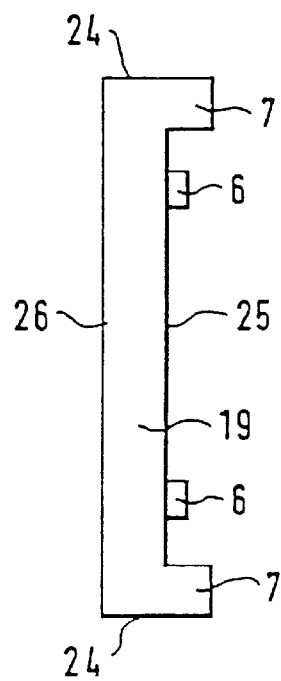
FIG. 3: shows a side view of an illumination unit according to the present invention.

FIG. 3 depicts a cross-section through the illumination unit, shown in FIGS. 1 and 2, along intersection line AA' shown in FIG. 1. Again, identical component parts are provided with identical reference numbers. Base plate 19 has an approximately rectangular cross-section, the first top surface 25, second top surface 26 and both long end faces 24 being shown as intersection lines. An elevation, i.e., the retaining frame, is provided at the edge of first top surface 25. Two fixing pins 6 are also shown on first top surface 25. Light emitted by lamp 9 is now either irradiated directly into base plate 19, or is coupled into base plate 19 with the aid of reflector 10. The light coupled into base plate 19 is reflected at the cut surfaces of slits 8 which, if desired, can be polished or provided with a reflective coating for this purpose. Furthermore, the light, which spreads in a direction approximately parallel to the top surfaces, is totally reflected at them. Due to these reflection effects, the light remains restricted mainly to waveguide zone 1 of base plate 19. Portions of the light conducted in waveguide zone 1 are not totally reflected at first top surface 25, but rather are emitted. Therefore, the material for base plate 19 is selected such that it has a slightly light-diffusing effect; however, other physical arrangements, such as the structuring of one or both top surfaces with prisms, as described in the German Patent Application No. 96 52 209.9, are also conceivable. By providing depressions 11, it is possible to mount lamps 9 and reflectors 10 in the same base plate 19 which also has waveguide zone 1. To make a liquid-crystal display using the illumination unit according to the present invention, the various required filters can be placed on top surface 25 in the form of films. For this purpose, the films should have an approximately rectangular form, with dimensions which are selected such that they are smaller than the inside dimensions of retaining frame 7. It is also possible to provide the films with four circular holes which are arranged in such a way that the films can be supported with the assistance of fixing pins 6. A liquid-crystal cell, composed of two glass panes with the liquid crystal situated in between, is then placed on fixing pins 6 above the film. The external dimensions of the liquid-crystal cell are selected in such a way that it is held against retaining frame 7, free from play and strain. Usually, a liquid-crystal cell has an electrical connection in the form of a flexible strip having imprinted electric conductors. This flexible strip can be run through cutout 5 to the back side, and folded there onto second top surface 26. An electronics board and, optionally, a rear cover can also be secured on second top surface 26 with the aid of fixing bore holes 2.

The exemplary embodiment shown in FIGS. 1 through 3 can easily be adapted to other designs of lamps 10, for example, an L- or U-shaped lamp, or even to a different number of cylindrical lamps. In particular, allowance is also made to furnish a depression 11 only on one long end face of base plate 19, and to mount a single bar-shaped lamp. In this case, it is also advantageous to apply a reflecting coating to the second long end face opposite of the lamp.

It is also conceivable and provision is made for using massive mirror (reflector) elements, particularly of metal or metallic layers, to limit waveguide zone 1, instead of using slits 8 which are relatively easy to produce. To this end, after producing a massive base plate 19, it is possible to provide slits in base plate 19, a mirror then being inserted and secured in the slits. If base plate 19 is produced using a casting process, for example, reaction casting, injection molding or pressure die casting, then it is also possible to first introduce the mirror into the casting mold, and then cast around with the material for base plate 19.

It is further possible for slits 8 to pass right through, so that they interconnect two mutually opposing depressions 11 or end faces. In this case, however, it is necessary that the first top surface and the second top surface not be interconnected.

It is also possible and allowance is made for making the depth of slits 8 greater where they are at a greater distance from the lamp, since in this manner, the light is homogenized within the waveguide zone.

Figure 4:
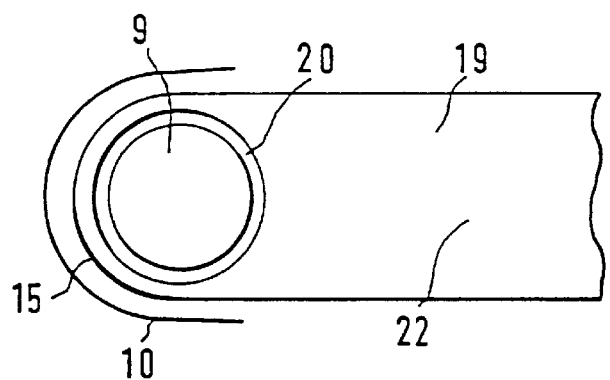
FIGS. 4 and 5: show detail drawings for mounting the lamp of an illumination unit according to the present invention.

A particularly simple possibility for mounting the lamp in the base plate is shown in FIG. 4. To this end, starting from a short end face, base plate 19 is provided with a bore hole 20 having a diameter which is somewhat greater than the outside diameter of lamp 9, and running in a direction parallel to long end face 24 and to the upper surface. Lamp 9 is supported in this bore hole 20. Additionally, the long end face can now be rounded off, so that instead of a long end face, rounding 15 results. Rounding 15 can then ideally be used for placing a mirror.

It is also possible and provision is made for selecting the lamp mounting shown in FIG. 4, without providing base plate 19 with depression 11. If, in this case, the long end face is replaced over its entire length by the rounding, then a mirror 15 can also be produced by vapor-depositing a reflecting material on rounding 15.

Figure 5:
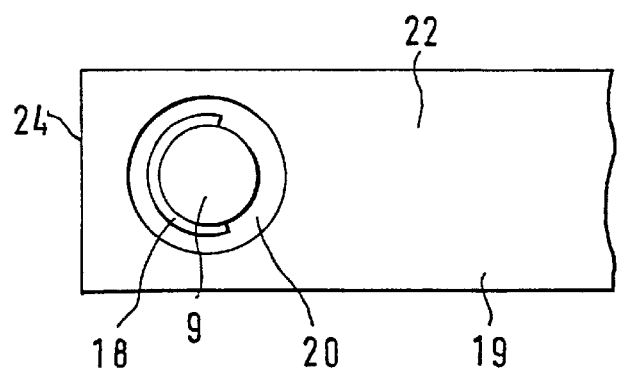

A further exemplary embodiment is shown in FIG. 5. FIG. 5 again shows the top view of a first short end face 22 of a base plate 19. Starting from first short end face 22, base plate 19 is provided with a bore hole 20 running in a direction approximately perpendicular to first short end face 22 and approximately parallel to long end face 24. Again, a lamp 9 is inserted into bore hole 20. A reflective coating 18, made, for example, of vapor-deposited metal, is applied on the body of lamp 9. Reflective coating 18 covers approximately half or two thirds of the surface area of the cylindrical form of lamp 9, so that light can emerge from the lamp only in the direction of waveguide zone 1 of base plate 19. Due to this reflective coating 18 applied to lamp 9, the outlay required for assembling the illumination unit and a liquid-crystal display mounted on it is further reduced.

What is claimed is:

1. An illumination unit for planar illumination, comprising:

a first light source;
a waveguide plate, the waveguide plate being made of one of transparent material and slightly light-diffusing material, the waveguide plate including a first mounting support for mounting one of a second plate and a film to be placed on a top surface of the waveguide plate, the waveguide plate having a first region and a second region, the mounting support being arranged in the first region, light emitted by the first light source being coupled into the second region, the waveguide plate further including an arrangement for substantially limiting light from the light source from being transmitted from the second region into the first region, the arrangement being arranged between the first region and the second region.

2. The illumination unit according to claim 1, wherein the mounting support mounts a liquid-crystal cell placed over the film.

3. The illumination unit according to claim 1, wherein the mounting support includes fixing pins and a retaining frame.

4. The illumination unit according to claim 1, wherein the arrangement for substantially limiting light from being transmitted from the second region into the first region includes slits.

5. The illumination unit according to claim 4, wherein, with increasing distance from the first light source, the slits are provided with a greater depth.

6. The illumination unit according to claim 1, wherein the arrangement for substantially limiting light from being transmitted from the second region into the first region includes mirrors integrated into the waveguide plate.

7. The illumination unit according to claim 1, wherein the film is one of a polarizer film and a prismatic film which is placed directly on the waveguide plate.

8. The illumination unit according to claim 1, wherein the first light source is bar-shaped.

9. The illumination unit according to claim 1, wherein the waveguide plate further includes an arrangement for mounting the first light source.

10. The illumination unit according to claim 1, further comprising:

a reflector which directs light emitted by the first light source one of indirectly and directly into the waveguide plate, a second mounting support being provided in the waveguide plate for mounting the reflector.

11. The illumination unit according to claim 1, wherein the first light source is provided with a reflective coating on a side of the first light source facing away from the waveguide plate.

12. The illumination unit according to claim 1, wherein the waveguide plate has a bore hole so that the first light source is surrounded by the waveguide plate.

13. The illumination unit according to claim 1, wherein a second light source is arranged on the waveguide plate, the second light source being arranged on a side of the waveguide plate opposite of the first light source.

14. The illumination unit according to claim 1, further comprising a fixing pin acting as a fastener.

15. The illumination unit according to claim 14, wherein the fixing pin is cylindrical and is perpendicular to the first region.

16. The illumination unit according to claim 1, wherein the arrangement includes a slit.

17. The illumination unit according to claim 1, wherein the arrangement includes a slit, and wherein a cut surface of the slit is polished to provide a reflective surface.

18. The illumination unit according to claim 1, wherein the arrangement includes a slit, and wherein a cut surface of the slit has a reflective coating to provide a reflective surface.

19. The illumination unit according to claim 1, further comprising a fastener situated on one side of the waveguide plate facing a liquid crystal display.

20. The illumination unit according to claim 1, wherein a side of the first light source has a reflective coating.

21. The illumination unit according to claim 1, further comprising a second light source situated on the waveguide plate.

22. The illumination unit according to claim 1, further comprising:

the one of the second plate and the film mounted on the top surface to the waveguide place using the first mounting support.

\* \* \* \* \*